(12) United States Patent
Beuting et al.

(10) Patent No.: US 11,312,439 B2
(45) Date of Patent: Apr. 26, 2022

(54) ADJUSTABLE SEAT ASSEMBLY FOR A MOTORCYCLE, AND MOTORCYCLE

(71) Applicant: Bayerische Motoren Werke Aktiengesellschaft, Munich (DE)

(72) Inventors: Guido Beuting, Munich (DE); Helmut Diehl, Kochel (DE); Christian Hahn-Woernle, Munich (DE); Miroslav Nikolic, Munich (DE); Raimund Schell, Oberschleissheim (DE); Joerg Seiler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/292,759

(22) PCT Filed: Nov. 4, 2019

(86) PCT No.: PCT/EP2019/080026
§ 371 (c)(1),
(2) Date: May 11, 2021

(87) PCT Pub. No.: WO2020/120027
PCT Pub. Date: Jun. 18, 2020

(65) Prior Publication Data
US 2021/0394851 A1 Dec. 23, 2021

(30) Foreign Application Priority Data
Dec. 14, 2018 (DE) ..................... 10 2018 132 231.3

(51) Int. Cl.
*B62J 1/00* (2006.01)
*B62J 1/10* (2006.01)
*B62J 1/12* (2006.01)

(52) U.S. Cl.
CPC .. *B62J 1/10* (2013.01); *B62J 1/12* (2013.01)

(58) Field of Classification Search
CPC .. B60N 2/665; B60N 2/914; B62J 1/26; B62J 1/12; B62J 1/00
(Continued)

(56) References Cited

U.S. PATENT DOCUMENTS

| 4,462,634 A | 7/1984 | Hanagan |
| 4,527,831 A | 7/1985 | Katsuoka |

(Continued)

FOREIGN PATENT DOCUMENTS

| CN | 1517262 A | 8/2004 |
| CN | 1550402 A | 12/2004 |

(Continued)

OTHER PUBLICATIONS

International Search Report (PCT/ISA/210) issued in PCT Application No. PCT/EP2019/080026 dated Jan. 31, 2020 with English translation (five (5) pages).

(Continued)

*Primary Examiner* — Sarah B McPartlin
(74) *Attorney, Agent, or Firm* — Crowell & Moring LLP

(57) ABSTRACT

An adjustable seat assembly for a motorcycle includes a seat pan with a first portion and a second portion, and an adjustment mechanism. The first portion of the seat pan has a fastening portion for the non-adjustable fastening of the first portion on the motorcycle, preferably on a tank of the motorcycle. The adjustment mechanism is connected to the second portion of the seat pan and is configured to adjust the height and/or inclination of the second portion of the seat pan in relation to the first portion. A motorcycle with the adjustable seat assembly is also provided.

13 Claims, 2 Drawing Sheets

(58) Field of Classification Search
USPC .......................................... 297/201, 215.13
See application file for complete search history.

(56) References Cited

U.S. PATENT DOCUMENTS

| | | | | |
|---|---|---|---|---|
| 4,563,038 | A * | 1/1986 | Hirose | ........................ B62J 1/12 297/243 |
| 5,533,783 | A * | 7/1996 | Harms | ........................ B62J 1/12 180/219 |
| 5,975,629 | A | 11/1999 | Lorbiecki | |
| 8,376,455 | B2 * | 2/2013 | Inoue | ........................ B62J 1/12 297/215.15 |
| 2004/0222679 | A1 | 11/2004 | Michisaka et al. | |
| 2005/0206204 | A1 | 9/2005 | Ogawa et al. | |

FOREIGN PATENT DOCUMENTS

| | | |
|---|---|---|
| CN | 1669865 A | 9/2005 |
| CN | 1746067 A | 3/2006 |
| CN | 200995725 Y | 12/2007 |
| CN | 103895739 A | 7/2014 |
| CN | 207985028 U | 10/2018 |
| DE | 20 2014 001 509 U1 | 5/2014 |
| EP | 0 718 144 A1 | 6/1996 |
| EP | 1 437 293 A2 | 7/2004 |
| EP | 2 298 632 A1 | 3/2011 |
| WO | WO 2013/124829 A1 | 8/2013 |

OTHER PUBLICATIONS

German-language Written Opinion (PCT/ISA/237) issued in PCT Application No. PCT/EP2019/080026 dated Jan. 31, 2020 (six (6) pages).
German-language Search Report issued in German Application No. 10 2018 132 231.3 dated Aug. 7, 2019 with partial English translation (12 pages).
Chinese-language Office Action issued in Chinese Application No. 201980076082.9 dated Jan. 17, 2022 with English translation (18 pages).

* cited by examiner

ADJUSTABLE SEAT ASSEMBLY FOR A MOTORCYCLE, AND MOTORCYCLE

BACKGROUND AND SUMMARY OF THE INVENTION

The invention relates to an adjustable seat assembly for a motorcycle, and to a motorcycle.

Motorcycles with a height-adjustable seat bench are known in different variants. In order to adjust the height of the seat bench, an adjusting apparatus is typically provided below the seat bench, which adjusting apparatus is actuated mechanically or electrically and is configured to adjust the height of the seat bench.

In the case of motorcycles, the seat bench usually adjoins the tank of the motorcycle. Therefore, in the case of an adjustment in the height of the seat bench, a gap, located between the tank and the seat bench, also changes. If the gap becomes too large, rainwater can penetrate into the gap and can pass to components of the motorcycle which are situated below the seat bench. Moreover, an excessively large gap can give the customer the impression of low value.

Therefore, it is an object of the invention to provide a motorcycle with an adjustable seat assembly, in the case of which motorcycle the disadvantages from the prior art are eliminated.

The object is achieved according to the invention by way of an adjustable seat assembly for a motorcycle, with a seat pan which has a first section and a second section, and with an adjusting device. The first section of the seat pan has a fastening section for fixed and non-adjustable fastening of the first section to the motorcycle. The adjusting device is connected to the second section of the seat pan and is configured to adjust a height and/or an inclination of the second section of the seat pan with respect to the first section.

Here, a seat face for a rider and possibly for a pillion passenger is provided on a seat cushion which is attached to the second section of the seat pan. Here, the seat pan is to be understood to mean all the frame parts of the seat assembly, and therefore not, for example, seat cushions of the seat assembly which are attached to the seat pan.

Therefore, by means of the adjusting device, that part of the seat pan which is assigned to the actual seat face can be adjusted. The first section of the seat pan which is accordingly not assigned a seat face is connected in contrast fixedly and non-adjustably to a component of the motorcycle, in particular to a frame part of the motorcycle, the first section being arranged in front of the second section in relation to the longitudinal direction of the motorcycle.

As a result, a gap which remains constant in the case of a height and/or inclination adjustment of the second section and therefore of the seat face is ensured between the first section and the component of the motorcycle. Here, the size of the gap can be selected in such a way that the penetration of rainwater below the adjustable seat assembly is prevented. Therefore, reliable weatherproofing of components of the motorcycle which lie below the seat assembly is achieved by way of the seat assembly according to the invention.

One aspect of the invention provides that the adjusting device comprises a supporting element, on which the second section lies and which can be attached to the motorcycle, the supporting element defining the height and/or the inclination of the second section with respect to the first section. If the seat pan is attached to the motorcycle, the supporting element forms a spacer element which defines at least in sections the spacing of the second section of the seat pan from the body of the motorcycle and therefore the height and/or the inclination of the second section with respect to the first section.

The supporting element can preferably be replaced. The supporting element can therefore be exchanged for a supporting element of different design, the different supporting elements, in particular, defining in each case a different height and/or inclination of the second section with respect to the first section. In order to adjust the height and/or the inclination of the seat face, the supporting element therefore merely has to be exchanged simply for another supporting element.

As an alternative or in addition, the supporting element itself can be capable of being adjusted between at least two positions, the two positions defining heights and/or inclinations which differ from one another of the second section with respect to the first section.

The adjusting device can be capable of being actuated electrically and/or mechanically. Accordingly, the adjusting mechanism comprises an electric motor and/or a mechanical mechanism, by means of which the inclination and/or the height of the second section above the first section can be adjusted. The height and/or inclination adjustment can take place at least partially automatically and/or manually.

Here, the adjusting device can preferably be actuated without it being necessary for parts, such as the seat cushion, to be removed from the seat assembly. For this purpose, the adjusting device can have an actuating element which is accessible from outside the motorcycle, such as an adjusting wheel for actuating the mechanical mechanism and/or an actuating switch for the electric motor.

In particular, the above-described supporting element can be adjusted between the at least two positions by means of the electric motor and/or by means of the mechanical mechanism.

In principle, however, the adjusting device can comprise any actuating mechanism which is known from the prior art and is suitable for changing the height and/or the inclination of the second section with respect to the first section.

In accordance with one refinement of the invention, the adjusting device is configured to adjust the second section of the seat pan in such a way that a seat face which is assigned to the second section is displaced substantially parallel to the seat face. Within the context of this disclosure, "displaced . . . parallel" means that the seat face experiences a parallel displacement. In other words, this is a pure height adjustment of the seat bench. The inclination of the seat face therefore does not change in the process.

In accordance with a further aspect of the invention, the first and the second section of the seat pan are connected to one another at least via a part of the adjusting device. Together with the part of the adjusting device, the first and the second section of the seat pan form a prefabricated structural unit which can be installed as a whole on the motorcycle. As a result, the mounting of the seat assembly on the motorcycle is facilitated, since attention no longer has to be paid to relative positioning of the two sections of the seat pan in the process.

As an alternative, the first and the second section of the seat pan can also be configured separately from one another, in particular not connected directly to one another. The adjusting device is then preferably connected merely to the second section, that is to say, in particular, is not connected to the first section.

In particular, the adjusting device comprises at least one hinged element which connects the first and the second section such that they can be pivoted relative to one another. In this refinement of the invention, an inclination and/or height adjustment of the second section takes place by virtue of the fact that the second section is pivoted with respect to the first section in a manner which is guided by at least one hinged element. A plurality of hinged elements which connect the first and the second section such that they can be pivoted relative to one another can also be provided.

Here, a play can be provided between the first section and the second section, in order to compensate for spacing changes which occur during the pivoting movement between the first section and the second section.

A further aspect of the invention provides that the seat assembly has a first seat cushion and a second seat cushion, the first and the second seat cushion being arranged, in particular fastened, on the first and on the second section, respectively, of the seat pan. Here, the seat face for the rider and possibly for the pillion passenger is provided on the second seat cushion, whereas the first seat cushion is substantially a decorative component.

The two seat cushions are preferably covered with a common seat cushion cover. This reliably prevents it being possible for rainwater and/or dirt to pass into gaps between the seat cushions.

Moreover, the object is achieved according to the invention by way of a motorcycle with a seat assembly as described above, the first section of the seat pan being connected fixedly and non-adjustably to a component, in particular a body component and/or a frame component, of the motorcycle. As has already been explained above, the inclination and/or height of merely the second section of the seat pan, which section is assigned the seat face for the rider and possibly for the pillion passenger, can be adjusted with respect to the motorcycle. In contrast, the first section is non-adjustable, as a result of which a gap which remains constant during an adjustment of the second section is achieved between the first section and the component, in particular the body component, of the motorcycle. With regard to the further advantages, reference is made to the above explanations.

In accordance with one refinement of the invention, the first section of the seat pan adjoins a tank of the motorcycle, the first section of the seat pan, in particular, being connected fixedly to the tank. The seat assembly according to the invention therefore achieves a constant gap between the seat assembly and the tank and therefore optimum weatherproofing.

The adjusting device can have a supporting element which is arranged between the second section of the seat pan and the component, the supporting element, in particular, lying on the component and/or being attached fixedly to the component. The supporting element therefore forms a spacer element which defines at least in sections the spacing of the second section of the seat pan from the body of the motorcycle and therefore the height and/or the inclination of the second section with respect to the first section.

Further advantages and features of the invention result from the following description and the appended drawings.

DETAILED DESCRIPTION OF THE DRAWINGS

Figure 1:
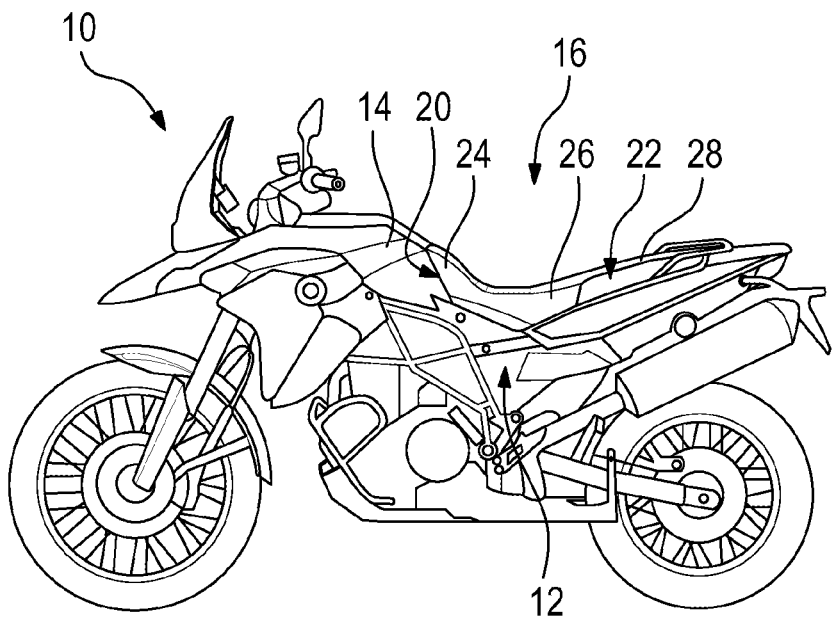
FIG. 1 shows a side view of a motorcycle according to an embodiment of the present invention.

FIG. 1 shows a motorcycle 10 which is configured as a motorbike. The motorcycle has a body 12, a tank 14 and an adjustable seat assembly 16.

Figure 2:
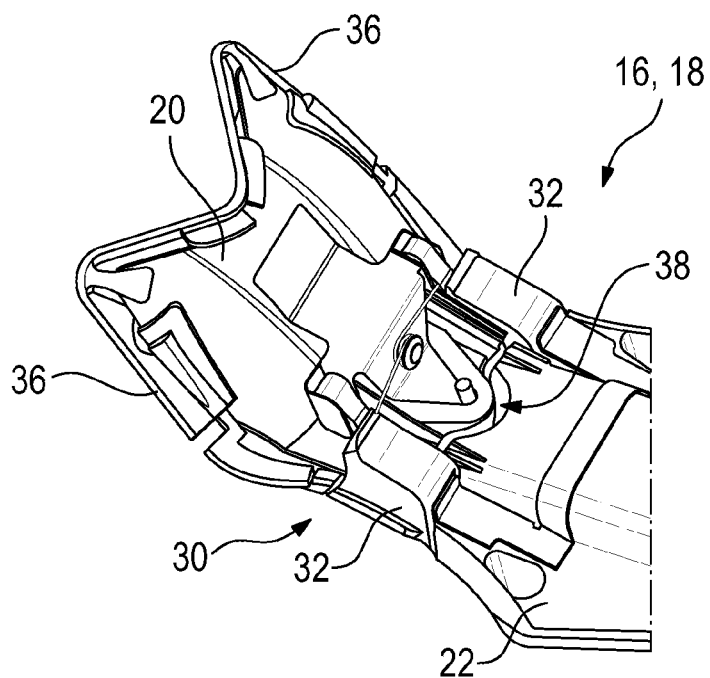
FIG. 2 shows an oblique view of a seat pan of a seat assembly according to the invention.
Figure 3:
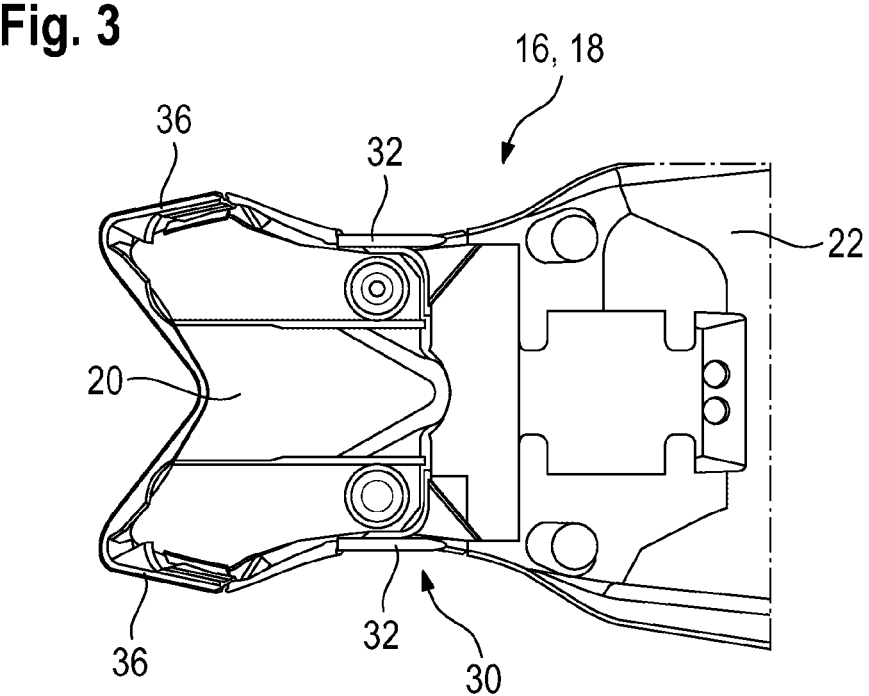
FIG. 3 shows the seat pan from FIG. 2 in a view from below.

The seat assembly 16 comprises a seat pan 18 which is shown in FIGS. 2 and 3 and has a first section 20 and a second section 22. Furthermore, the seat assembly 16 has a first seat cushion 24 and a second seat cushion 26 which are covered with a common seat cushion cover 28. Here, the first seat cushion 24 is attached to the first section 20 and the second seat cushion 26 is attached to the second section 22. The two seat cushions 24, 26 are not shown in FIGS. 2 and 3 for illustrative reasons.

A seat face for a rider and possibly for a pillion passenger is provided on the second seat cushion 26. In contrast, the first seat cushion 24 can be substantially a decorative component.

Furthermore, the seat assembly 16 has an adjusting device 30 with two hinged elements 32 and a supporting element 34. The adjusting device 30 is configured to adjust a height and/or an inclination of the second section 22 with respect to the first section 20.

The first section 20 of the seat pan 18 has a fastening section 36, via which the first section 20 is attached fixedly and non-displaceably to the motorcycle 10, more precisely to the tank 14. In particular, the fastening section 36 is fastened to the tank 14 by means of suitable fastening means, for example by means of screws and/or bolts.

The first section 20 and the second section 22 are connected to one another such that they can be pivoted relative to one another by way of the two hinged elements 32 of the adjusting device 30, the pivot axis of the pivoting movement running substantially transversely with respect to the longitudinal direction of the motorcycle 10.

As can be seen in FIGS. 2 and 3, the two hinged elements 32 are attached, as viewed in the longitudinal direction of the motorcycle 10, in each case to a lateral, front end of the second section 22 and in each case to a lateral, rear end of the first section 20.

As an alternative, however, the two sections 20, 22 might also be connected to one another via merely one hinged element 32 or via more than two hinged elements 32.

Here, in contrast to the first section 20, the second section 22 is not directly connected fixedly to the motorcycle 10, with the result that the second section 22 can be pivoted for inclination and/or height adjustment with respect to the first section 20 and therefore with respect to the motorcycle 10.

Here, a play 38 is provided between the first section 20 and the second section 22, in order possibly to compensate for a spacing change between the first section 20 and the second section 22, which spacing change can occur in the case of a pivoting movement of the second section 22.

In particular, the pivoting movement takes place in such a way that the seat face which is assigned to the second section 22 is displaced substantially parallel to the seat face, that is to say in such a way that the seat face experiences a parallel displacement. In other words, the inclination of the seat face does not change in the process.

The supporting element 34 of the adjusting device 30 is arranged between the second section 22 and the body 12, the supporting element 34, in particular, being attached fixedly to the body 12 and/or to a frame component of the motorcycle 10, for example by means of suitable fastening means such as screws and/or bolts.

Figure 4:
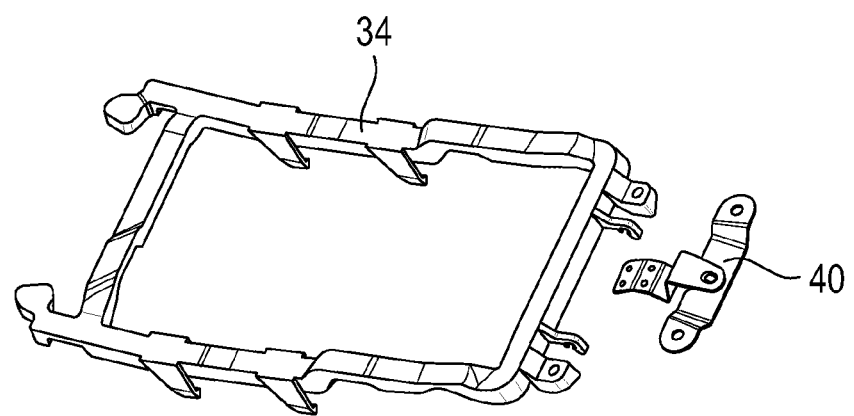
FIG. 4 shows an oblique view of a supporting element of the seat assembly according to the invention from FIG. 2.

As shown in FIG. 4, the supporting element 34 can have a fastening element 40, by means of which the supporting element 34 can be attached to the body 12 and/or the frame component, in particular by means of suitable fastening means such as screws and/or bolts.

The second section 22 lies at least in sections on the supporting element 34, as a result of which the supporting element 34 defines at least in sections a spacing of the second section 22 from the body 12 and therefore a height and/or an inclination of the second section 22 with respect to the body 12. The supporting element 34 therefore forms a type of spacer element between the body 12 and the second section 22.

The supporting element 34 can preferably be replaced. The supporting element 34 can therefore be exchanged for a further supporting element of different design, the further supporting element, in particular, defining a different height and/or inclination of the second section 22 with respect to the first section 20 than the supporting element 34. In order to adjust the height and/or the inclination of the seat face, the supporting element therefore merely has to be replaced simply by another supporting element.

In that embodiment of the seat assembly 16 which is shown in FIGS. 2 to 4, the height and/or inclination adjusting capability of the second section 22 is therefore achieved by virtue of the fact that the second section 22 can be pivoted with respect to the first section 20. The defining of a certain height and/or a certain inclination of the second section 22 with respect to the first section 20 and therefore with respect to the motorcycle 10 takes place by way of the above-described, separate supporting element 34 which serves as a spacer element between the second section 22 and the body 12.

As a consequence, the inclination and/or the height of the seat face can be adjusted, for example, by means of the following steps: first of all, the second section 22 is pivoted upward, and the supporting element 34 is removed from the body 12. Afterward, another supporting element 34 is attached to the body 12, and the second section 22 is pivoted downward again, with the result that the second section 22 then has a changed height and/or inclination with respect to the first section 20.

Other embodiments of the adjusting device 30 are of course also possible, however. It is decisive merely that the first section 20 is connected fixedly and non-displaceably to the motorcycle 10, in particular the tank 14, whereas the second section 22 can be adjusted with respect to the first section 20, that is to say is not attached fixedly to the body 12 and/or to a frame component of the motorcycle 10.

The adjusting device 30 can comprise an electric motor and/or a mechanism, by means of which the inclination and/or the height of the second section 22 with respect to the first section 20 can be adjusted. Here, the height and/or inclination adjustment can take place at least partially automatically and/or manually.

The adjusting device 30 can be capable of being actuated, without it being necessary for the seat cushions 24, 26 and/or other components to be removed from the seat assembly 16. For this purpose, the adjusting device 30 can have an actuating element which is accessible from the outside, such as an adjusting wheel for actuating the mechanical mechanism and/or an actuating switch for the electric motor.

Moreover, the supporting element 34 itself can be capable of being adjusted between at least two positions, the two positions defining heights and/or inclinations which differ from one another of the second section 22 with respect to the first section 20.

In particular, the above-described supporting element 34 can be adjusted between the at least two positions by means of the electric motor and/or by means of the mechanical mechanism.

What is claimed is:

1. An adjustable seat assembly for a motorcycle, comprising:
a seat pan having a first section and a second section; and
an adjusting device,
wherein
the first section of the seat pan has a fastening section configured for fixed and non-adjustable fastening of the first section to the motorcycle,
the first section of the seat pan does not extend in a longitudinal direction of the motorcycle beyond a rear end of the second section of the seat pan, and
the adjusting device is connected to the second section of the seat pan and is configured to adjust at least one of a height and an inclination of the second section of the seat pan with respect to the first section.

2. The seat assembly according to claim 1, wherein
the adjusting device includes a supporting element attachable to the motorcycle and configured to support the second section; and
the supporting element is configured to define at least one of the height and the inclination of the second section with respect to the first section.

3. The seat assembly according to claim 2, wherein
the supporting element is replaceable.

4. The seat assembly according to claim 1, wherein
the adjusting device is at least one of electrically and mechanically actuatable.

5. The seat assembly according to claim 1, wherein
the adjusting device is configured to adjust the second section of the seat pan such a that a seat face of the second section is displaceable substantially parallel to an initial orientation of the seat face.

6. The seat assembly according to claim 1, wherein
the first section and the second section of the seat pan are connected to one another via at least a part of the adjusting device.

7. The seat assembly according to claim 6, wherein
the adjusting device includes at least one hinged element which connects the first section and the second section such that they are pivotable relative to one another.

8. The seat assembly according to claim 1, wherein
the seat assembly has a first seat cushion and a second seat cushion, the first seat cushion and the second seat cushion each being arranged respectively on first section and the second section of the seat pan.

9. The seat assembly according to claim 8, wherein
the first seat cushion and the second seat cushion are covered with a common seat cushion cover.

10. A motorcycle comprising:
an adjustable seat assembly for a motorcycle having a seat pan having a first section and a second section, and an adjusting device,
wherein
the first section of the seat pan has a fastening section configured for fixed and non-adjustable fastening of the first section to the motorcycle,
the first section of the seat pan does not extend in a longitudinal direction of the motorcycle beyond a rear end of the second section of the seat pan, the adjusting device is connected to the second section of the seat pan and is configured to adjust at least one of a height and an inclination of the second section of the seat pan with respect to the first section, and the first section of the seat pan is connected fixedly and non-adjustably to a component of the motorcycle.

11. The motorcycle according to claim 10, wherein the motorcycle component is a tank of the motorcycle, and the first section of the seat pan adjoins and is connected to the tank of the motorcycle.

12. The motorcycle according to claim 11, wherein the adjusting device includes a supporting element arranged between the second section of the seat pan and the tank, and the supporting element is at least one of in contact with and attached fixedly to the tank.

13. The motorcycle according to claim 11, wherein the adjusting device includes a supporting element arranged between the second section of the seat pan and the tank, and the supporting element is at least one of in contact with and attached fixedly to the tank.

\* \* \* \* \*